(12) United States Patent
Gysling

(10) Patent No.: US 6,698,297 B2
(45) Date of Patent: Mar. 2, 2004

(54) VENTURI AUGMENTED FLOW METER

(75) Inventor: Daniel L. Gysling, Glastonbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 10/186,382

(22) Filed: Jun. 28, 2002

(65) Prior Publication Data

US 2004/0000197 A1 Jan. 1, 2004

(51) Int. Cl.$^7$ .................................................. G01F 1/44
(52) U.S. Cl. ................................................... 73/861.63
(58) Field of Search ........................ 77/861.63, 861.77, 77/861.04, 861.42; 250/227.18

(56) References Cited

U.S. PATENT DOCUMENTS

| | | | |
|---|---|---|---|
| 3,149,492 A | | 9/1964 | Weinberg |
| 3,851,521 A | | 12/1974 | Ottenstein |
| 4,080,837 A | | 3/1978 | Alexander |
| 4,114,439 A | | 9/1978 | Fick |
| 4,144,768 A | | 3/1979 | Andersson |
| 4,159,646 A | | 7/1979 | Paulsen |
| 4,164,865 A | | 8/1979 | Hall |
| 4,236,406 A | | 12/1980 | Reed |
| 4,275,602 A | | 6/1981 | Fujishiro |
| 4,445,389 A | | 5/1984 | Potzick |
| 4,499,418 A | | 2/1985 | Helms |
| 4,515,473 A | | 5/1985 | Mermelstein |
| 4,520,320 A | | 5/1985 | Potzick |
| 4,546,649 A | | 10/1985 | Kantor |
| 4,706,501 A | | 11/1987 | Atkinson |
| 4,788,852 A | | 12/1988 | Martin |
| 4,813,270 A | | 3/1989 | Baillie |
| 4,858,474 A | * | 8/1989 | Glasheen et al. ...... 73/861.352 |
| 4,862,750 A | | 9/1989 | Nice |

(List continued on next page.)

FOREIGN PATENT DOCUMENTS

| | | |
|---|---|---|
| DE | 19511234 | 12/1995 |
| EP | 0684458 | 5/1995 |
| FR | 2 357 868 | 7/1976 |
| JP | 406082281 | 9/1992 |
| WO | WO 93/14382 | 7/1993 |
| WO | WO 96/04528 | 2/1996 |
| WO | WO 00/00793 | 1/2000 |

OTHER PUBLICATIONS

Nielsen, R. (1991) "Sonar Signal Processing", Artech Huse Inc., Chapter 2, p:51–59.

Krim A. and Viberg M. (1996) "Two Decades of Array Signal Processing Research", IEEE Signal Processing Magazine, p:67–94.

Kersey A. and Darkin, J., Editors (1992) SPIE vol. 1586, "Distributed and Multiplexed Fiber Optic Sensors", p:1–243.

Nerby et al. "A cost effective technique for production well testing", (1995) Offshore Technology Conference, p:505–515.

(List continued on next page.)

Primary Examiner—Edward Lefkowitz
Assistant Examiner—Jewel V. Thompson
(74) Attorney, Agent, or Firm—Moser, Patterson & Sheridan, L.L.P.

(57) ABSTRACT

A venturi-assisted flow meter arrangement is disclosed. The venturi is positioned in a pipe or conduit containing the fluid mixture to be measured upstream of the flow meter. The flow meter is preferably a flow rate meter and/or a phase fraction meter. When the fluid mixture is passed through the venturi, it is homogenized or mixed, which can increase the accuracy of the measurements made by the downstream flow meter. Additionally, the venturi can be used to compute the flow momentum of the fluid mixture, which may be used to calibrate or double check the operation of the flow meter, or allow it to compute the phase fraction for a three phase mixture.

71 Claims, 1 Drawing Sheet

U.S. PATENT DOCUMENTS

| | | |
|---|---|---|
| 4,864,868 A | 9/1989 | Khalifa |
| 4,884,457 A | 12/1989 | Hatton |
| 4,896,540 A | 1/1990 | Shakkottai |
| 4,932,262 A | 6/1990 | Wlodarczyk |
| 4,947,127 A | 8/1990 | Helms |
| 4,950,883 A | 8/1990 | Glenn |
| 4,976,151 A | 12/1990 | Morishita |
| 4,978,863 A * | 12/1990 | Lyons et al. ............... 250/574 |
| 4,996,419 A | 2/1991 | Morey |
| 5,024,099 A | 6/1991 | Lee |
| 5,031,460 A | 7/1991 | Kanekobu |
| 5,040,415 A | 8/1991 | Barkhoudarian |
| 5,051,922 A | 9/1991 | Toral |
| 5,058,437 A | 10/1991 | Chaumont |
| 5,083,452 A | 1/1992 | Hope |
| 5,099,697 A * | 3/1992 | Agar ....................... 73/861.04 |
| 5,115,670 A | 5/1992 | Shen |
| 5,152,181 A | 10/1992 | Lew |
| 5,207,107 A | 5/1993 | Wolf |
| 5,218,197 A | 6/1993 | Carroll |
| 5,317,576 A | 5/1994 | Leonberger |
| 5,321,991 A | 6/1994 | Kalotay |
| 5,347,873 A | 9/1994 | Vander Heyden |
| 5,361,130 A | 11/1994 | Kersey |
| 5,363,342 A | 11/1994 | Layton |
| 5,367,911 A | 11/1994 | Jewell |
| 5,372,046 A | 12/1994 | Kleven |
| 5,398,542 A | 3/1995 | Vasbinder |
| 5,401,956 A | 3/1995 | Dunphy |
| 5,426,297 A | 6/1995 | Dunphy |
| 5,440,932 A | 8/1995 | Wareham |
| 5,493,390 A | 2/1996 | Varasi |
| 5,493,512 A | 2/1996 | Peube |
| 5,513,913 A | 5/1996 | Ball |
| 5,564,832 A | 10/1996 | Ball |
| 5,576,497 A | 11/1996 | Vignos |
| 5,591,922 A * | 1/1997 | Segeral et al. ........... 73/861.04 |
| 5,597,961 A | 1/1997 | Marrelli |
| 5,639,667 A | 6/1997 | Heslot |
| 5,642,098 A | 6/1997 | Santa Maria |
| 5,644,093 A | 7/1997 | Wright |
| 5,654,551 A | 8/1997 | Watt |
| 5,670,720 A | 9/1997 | Clark |
| 5,680,489 A | 10/1997 | Kersey |
| 5,689,540 A | 11/1997 | Stephenson |
| 5,708,211 A | 1/1998 | Jepson |
| 5,730,219 A | 3/1998 | Tubel |
| 5,732,776 A | 3/1998 | Tubel |
| 5,741,980 A | 4/1998 | Hill |
| 5,803,167 A | 9/1998 | Bussear |
| 5,804,713 A | 9/1998 | Kluth |
| 5,842,347 A | 12/1998 | Kinder |
| 5,845,033 A | 12/1998 | Berthold |
| 5,906,238 A | 5/1999 | Carmody |
| 5,907,104 A | 5/1999 | Cage |
| 5,908,990 A | 6/1999 | Cummings |
| 5,925,821 A | 7/1999 | Bousquet |
| 5,925,879 A | 7/1999 | Hay |
| 5,939,643 A | 8/1999 | Oertel |
| 5,956,132 A | 9/1999 | Donzier |
| 5,959,547 A | 9/1999 | Tubel |
| 5,963,880 A | 10/1999 | Smith |
| 5,975,204 A | 11/1999 | Tubel |
| 5,992,519 A | 11/1999 | Ramakrishnan |
| 5,996,690 A | 12/1999 | Shaw |
| 6,002,985 A | 12/1999 | Stephenson |
| 6,003,383 A | 12/1999 | Zielinska |
| 6,003,385 A | 12/1999 | De Vanssay |
| 6,009,216 A | 12/1999 | Pruett |
| 6,016,702 A | 1/2000 | Maron |
| 6,158,288 A | 12/2000 | Smith |
| 6,216,532 B1 | 4/2001 | Stephenson |
| 6,233,374 B1 | 5/2001 | Ogle |
| 6,279,660 B1 | 8/2001 | Hay |
| 6,354,147 B1 | 3/2002 | Gysling |

OTHER PUBLICATIONS

Specification for U.S. patent application Ser. No. 09/346,607, filed Jul. 2, 1999, Attorney docket: WEAF:057.

Specification for U.S. patent application Ser. No. 09/740,760, filed Nov. 29, 2000, Attorney docket: WEAF:047.

Specification for U.S. patent application Ser. No. 09/346,604, filed Jul. 2, 1999, Attorney docket: WEAF:072.

Specification for U.S. patent application Ser. No. 09/519,785, filed Mar. 7, 2000, Attorney docket: WEAF:061.

Specification for U.S. patent application Ser. No. 09/346,606, filed Jul. 2, 1999, Attorney docket: WEAF:071.

Specification for U.S. patent application Ser. No. 09/346,605, filed Jul. 2, 1999, Attorney docket: WEAF:078.

Specification for U.S. patent application Ser. No. 10/010,183, filed Nov. 7, 2001, Attorney docket: WEAF:105.

Specification for U.S. patent application Ser. No. 09/344,069, filed Jun. 25, 1999, Attorney docket: WEAF:1067.

Gysling, D. (1999) "Development of a Fiber Optic Downhole Multiphase Flow Meter", in "Field Applications & New Technologies for Multiphase Metering", Multiphase Technology Series Conference, Aberdeen, Scotland.

Beranek, L. and Ver, I. (1992) in "Noise and Vibration Control Engineering, Principles and Application", John Wiley & Sons, Inc., Chapter 14, p:537–541.

Dowling, A and Williams, J. in "Sound and Sources of Sound", Ellis Horwood Limited, Section 4, p:79–80.

Kersey, A. et al. (1993) "Multiplexed Fiber Bragg Grating Strain–Sensor System with a Fiber Fabry–Perot Wavelength Filter", Optics Letters, 18:1370–1372.

Dandridge, A. & Cogdell, G. (1991) "Fiber Optic Sensors for Navy Applications", IEEE, LCS, 2:81–89.

Mesch, F. (1990) "Speed and Flow Measurement by an Intelligent Correlation System", Advances in Instrumentation and Control, Research Triangle Park, NC, part 4, p. 1899–1914.

Specification for U.S. patent application Ser. No. 09/345,827, filed Jul. 2, 1999, Attorney docket: WEAF:060.

\* cited by examiner

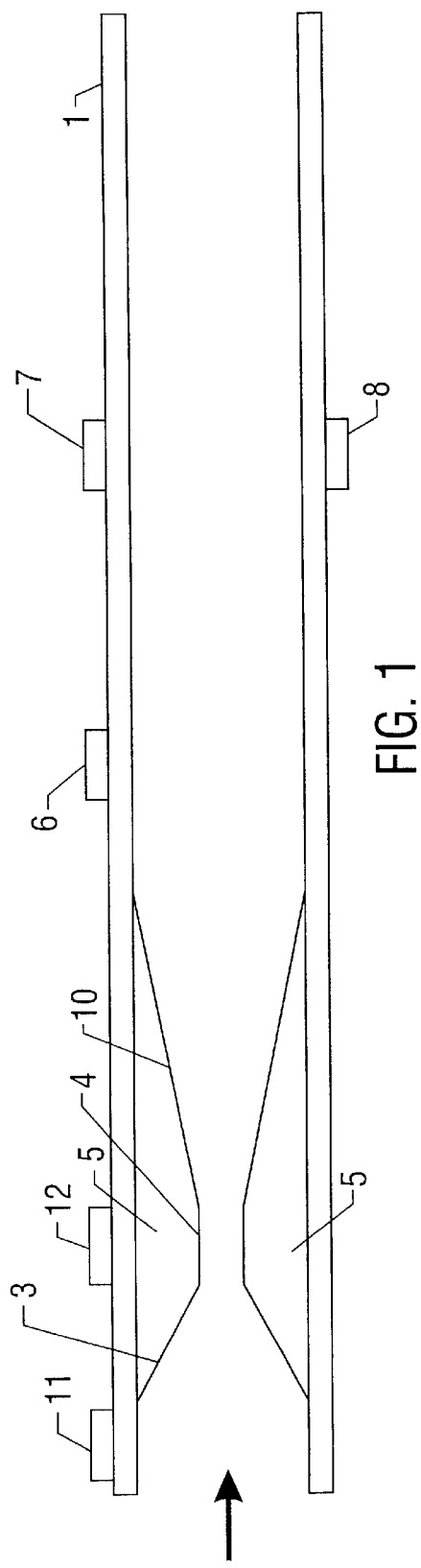
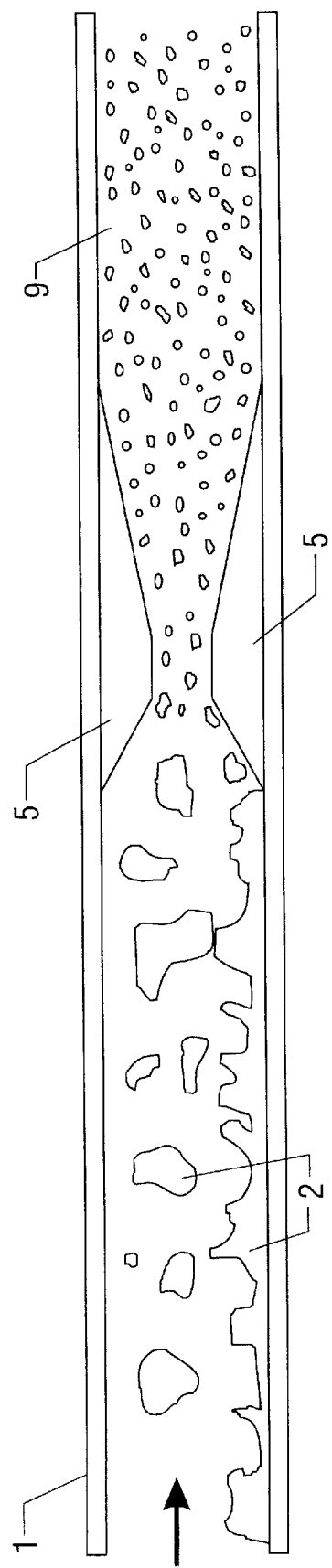
FIG. 1
FIG. 2

VENTURI AUGMENTED FLOW METER

TECHNICAL FIELD

This invention relates to measuring fluid parameters in pipes and more particularly to measuring fluid composition, volumetric flow, or other fluid parameters using a flow meter or meters assisted by a venturi.

BACKGROUND OF THE INVENTION

In many industries it is desirable to measure various parameters of fluids or fluid mixtures in pipes, including the temperature, pressure, composition (i.e., phase fraction, e.g., 10% water, 90% oil), flow rate, and the speed of sound (SOS) in the fluid or mixture. (As used herein, "fluid" may refer to a liquid or gas, and a "fluid mixture" may be mixtures of liquids or gases). Different sensor arrangements, referred to generically as "flow meters," can be used to measure these parameters, such as those that are disclosed in the following U.S. patent applications, which are incorporated herein by reference in their entireties, and which may have issued as U.S. patent Ser. No. 09/740,760, filed Nov. 29, 2000; Ser. No. 09/344,070, filed Jun. 25, 1999; Ser. No. 09/346,607, filed Jul. 2, 1999; Ser. No. 09/344,093, filed Jun. 25, 1999; Ser. No. 09/345,827, filed Jul. 2, 1999; Ser. No. 09/519,785, filed Mar. 7, 2000; Ser. No. 09/346,606, filed Jul. 2, 1999; Ser. No. 09/346,604, filed Jul. 2, 1999; Ser. No. 09/346,605, filed Jul. 2, 1999; Ser. No. 09/344,094, filed Jun. 25, 1999; Ser. No. 10/010,183, filed Nov. 7, 2001; and Ser. No. 09/344,069, filed Jun. 25, 1999.

A flow meter typically comprises a sensor, a sensor array, or multiple sensor arrays. In many of these flow meters, the sensors may comprise fiber optic sensors, possibly incorporating fiber Bragg gratings (FBGs), which can be mounted or coiled around the pipe containing the fluid to be measured. Other flow meters allow optical devices or other sensing devices to be ported or placed within the pipe to make the required measurements. When one uses a fiber optic based flow meter, the fluid or mixture parameters may be measured without the need to "tap in" to the pipe, as many of these parameters may be sensed externally to the pipe though the means disclosed in these incorporated references. Often, these externally mounted sensors are "passive" sensors in the sense that they do not require stimulating the fluid or mixture of interest by external means, but instead make the required measurements simply by sensing various naturally occurring fluid effects.

In the oil and gas industry, or comparable industries, it is desirable to measure, in situ, the flow produced from an oil well. Typically the produced fluid may be comprised of three components or phases, such as oil, water, and gas, which may additionally contain other components, such as solids (e.g., rocks or sand) or other liquid phases. In a production environment, it is often useful to determine the phase fraction, or composition, of the fluid being measured, as well as the speed of the flowing mixture.

Techniques for measuring fluid or mixture flow rate exist in the prior art. For example, in patent application Ser. No. 09/346,607, entitled "Flow Rate Measurement Using Unsteady Pressures," filed Jul. 2, 1999, incorporated herein by reference in its entirety, there is disclosed a flow rate meter which preferably uses fiber optic sensors. These fiber optic sensors are disposed at two different axial locations along the pipe containing the fluid to be measured. Naturally occurring pressure disturbances in the fluid perturb the first sensor through the wall of the pipe, creating a time-varying pressure signal. When the pressure disturbances, or pressure field, moves from the first sensor to the second sensor, a similar pressure signal is measured. The two signals from the pressure sensor can then be cross-correlated using well-known techniques to determine the time shift in the pressure signals. This time delay, when divided by the axial distance of the sensor, can be used to determine flow rate. Optionally, the sensors may comprise filters capable of filtering out certain undesirable wavelengths, which may constitute a single sensor or multiple sensors.

Other flow rate techniques using venturis are also known in the art. For example, U.S. Pat. No. 5,591,922, entitled "Method and Apparatus for Measuring Multiphase Flow," issued Jan. 7, 1997, and which is incorporated by reference herein in its entirety. In the '922 patent, a pair of venturis within a pipe are spaced from one another at an axial distance. As is well known, the venturi causes a pressure difference ($\Delta P$) at each venturi, which are measured. These differential pressure signals are cross-correlated to determine a time delay, which can then be divided by the axial distance to determine a flow velocity.

Flow meters for determining phase fraction ("phase fraction meter") in a fluid mixture are also known in the art. For example, U.S. Pat. No. 6,354,147, entitled "Fluid Parameter Measurement in Pipes Using Acoustic Pressures," issued Mar. 12, 2002, which is incorporated by reference herein in its entirety, a spatial array of pressure sensors, preferably fiber optic sensors, are coupled to the outside of the pipe. These sensor produce pressure signals, which are used to determine the speed of sound of the mixture. Because the speed of sound of a given mixture can be calculated from the speed of sound of the components in the mixture, the measured speed of sound can be used to determine the phase fraction of the mixture.

Often these various types of flow meters will be used in conjunction with each other to measure various fluid parameters of the device. For example, a flow rate meter may be used on one section of the pipe, followed downstream by a phase fraction meter, or vice versa. Or, these flow meters may be combined into an integrated flow meter apparatus.

The accuracy of these and other prior art flow meters are generally enhanced when the fluid mixture being measured is relatively well mixed or "homogenous." Relatively inhomogeneous mixtures, having larger unmixed portions of the components that constitute the mixture, may not provide suitable pressure disturbances (i.e., acoustic differences) that can be easily resolved by the pressure sensors that typical constitute a traditional flow meters. Additionally, prior art flow meters may have difficulties in measuring the parameters of fluid mixtures having more than two phases. The art would therefore benefit from ways to improve the performance of these and other traditional flow meter techniques.

SUMMARY OF THE INVENTION

A venturi-assisted flow meter arrangement is disclosed. The venturi is positioned in the pipe or conduit containing the fluid mixture to be measured upstream of the flow meter. The flow meter is preferably a flow rate meter and/or a phase fraction meter. When the fluid mixture is passed through the venturi, it is homogenized or mixed, which can increase the accuracy of the measurements made by the downstream flow meter. Additionally, the venturi can be used to compute the flow momentum of the fluid mixture, which may be used to calibrate or double check the operation of the flow meter, or allow it to compute the phase fraction for a three phase mixture.

BRIEF DESCRIPTION OF THE DRAWINGS

FIG. 1 is a side view of a pipe having a venturi placed upstream of traditional flow meter(s) to improve their performance.

FIG. 2 is a side view of a pipe with a venturi, illustrating homogenization of fluid flow.

DESCRIPTION OF ILLUSTRATIVE EMBODIMENTS

In the disclosure that follows, in the interest of clarity, not all features of actual commercial implementations of a venturi augmented flow meter and related techniques are described. It will of course be appreciated that in the development of any such actual implementation, as in any such project, numerous engineering and design decisions must be made to achieve the developers' specific goals, e.g., compliance with mechanical and business related constraints, which will vary from one implementation to another. While attention must necessarily be paid to proper engineering and design practices for the environment in question, it should be appreciated that development of a venturi augmented flow meter and related techniques would nevertheless be a routine undertaking for those of skill in the art given the details provided by this disclosure, even if such development efforts are complex and time-consuming.

FIG. 1 shows a cross section of a pipe 1 having a venturi 5 placed within. The fluid mixture within the pipe flows from left to right as indicated by the arrow. Downstream from the venturi, in a preferred embodiment, are a phase fraction meter 7 and a flow rate meter 8. Any suitable phase fraction meter 7 and/or flow rate meter 8 can be used in, and would be benefited by, the disclosed configuration. For example, the phase fraction meter 7 could constitute the meter disclosed in U.S. Pat. No. 6,354,147, entitled "Fluid Parameter Measurement in Pipes Using Acoustic Pressures," issued Mar. 12, 2002, which is incorporated by reference herein in its entirety. The flow meter could constitute the meter disclosed in U.S. patent application Ser. No. 09/346,607, entitled "Flow Rate Measurement Using Unsteady Pressures," filed Jul. 2, 1999, which is incorporated herein by reference in its entirety. The details of these flow meters are not disclosed herein, but preferably include passive fiber optic based sensors employing, or working in conjunction with, fiber Bragg grating (FBGs) in, for example, a scanning Fabry-Perot, acousto-optic tuned filter (AOTF), optical filter, or time-of-flight arrangement having sufficient sensitivity for the particular conditions and measurements to be made. Such sensors are capable of measuring one or more of the following parameters: pressure, temperature, speed of sound, axial momentum, and volumetric flow. The sensors may operate actively or passively.

While shown at the same location on the pipe, it should be understood that the meters 7 and 8 could be displaced axially along the pipe, i.e., in sequence. Moreover, the venturi 5 can be used in conjunction with the phase fraction meter 7 or flow rate meter 8 individually, although in a preferred embodiment it is preferred that both meters be present because in a commercial embodiment it is usually beneficial to know as much about the flowing fluid mixture as possible. Additionally, other types of flow meters may be added, and may be multiplexed together, which is facilitated when optical technologies are used. Each flow meter 7 and/or 8 can be incorporated into an existing section of pipe 1, or can be incorporated into a pipe section that is inserted in line into a production pipe or well casing.

Multiple phase fraction meters 7 and/or flow rate meters 8 could be employed, with such redundancy providing back up in case of meter failure or providing additional measurements to aid in measurement accuracy. The meters 7 and/or 8 may be placed in a housing within the production pipe or well casing. The housing may comprise a vessel, such as a pressure vessel, that serves to protect the sensing arrays and to physically and acoustically isolate them from the outside environment.

Also disclosed in FIG. 1 are pressure sensors 11 and 12, and a temperature sensor 6, for respectively measuring the pressure and temperature of the fluid mixture in the pipe. The use of such additional sensors may be useful in their own right to determine further parameters about the fluid, or to calibrate the system. For example, the density (and hence speed of sound) of a fluid component or mixture, measured by the phase fraction meter 7, varies as a function of temperature and pressure, and so the temperature and pressure measured by the sensors 11 and 6 are useful inputs into the phase fraction meter. It may also be useful to know the temperature and/or pressure to determine if materials within the mixture will volatize into a gaseous state, which again would change the speed of sound and/or affect the speed of sound/phase fraction calculation made by the phase fraction meter 7. The temperature and pressure sensors 6, 11, and 12 may be incorporated within the phase fraction meter 7 and/or the flow rate meter 8, or may occur at different locations along the pipe than those shown in FIG. 1. Additionally, the pressure sensors 11 and 12, may also be useful in computing the momentum of the fluid, as will be explained in further detail below.

The pressure sensors 11 and 12 and the temperature sensor 6 may constitute any several well known sensors, including fiber optic sensors, electrical sensors, piezoelectric sensors, and the like, such as those that are disclosed in the incorporated references. The sensors, depending on their construction, may be placeable on, around, or within the pipe, and at varying locations along its length. Moreover, these measurements, and particularly the pressure measurements by sensors 11 and 12 at the venturi, may be used to further improve the capabilities of the phase fraction meter 7 and/or the flow rate meter 8, as will be explained further below. Measuring the temperature and pressure via sensors 6, 11 and 12 may also be useful to calibrate the actual sensor elements themselves. For example, one skilled in the art will appreciate that the FBGs used in a preferred system have optical characteristics that will vary with temperature, and the temperature measurement may therefore be used to calibrate those sensor elements.

Venturi 5 could constitute any known material such as aluminum, iron, stainless steel, plastic, or similar materials, and could be affixed to the inside of the pipe 1 in any number of ways, including by brazing, soldering, bolting, glueing, or by a pressure fit. Alternatively, the venturi need not be a unitary piece but instead could be formed by deforming the pipe's surface, or could be separately formed and welded to respective ends of the pipe 1. Additionally, the venturi can be manufactured using a single solid cylinder, and machining the cylinder to form the venturi and related contiguous pipe structures. As one skilled in the art will realize, the composition of the venturi 5, and the means for affixing the venturi to the pipe 1, will necessarily depend on the composition (and possibly thickness) of the pipe and/or the environment in question. For example, where the venturi is to be employed in an oil/gas production pipe, and therefore potentially subject to corrosive chemicals, high temperatures, and mechanical disturbances (such as from sand or rock floating in the pipe), it may be beneficial for the venturi to comprise stainless steel welded to the inner diameter of the pipe.

The venturi is comprised of three sections: a converging inlet or approach section 3, a throat section 4, and an outlet or diffuser section 10. The inlet 3 may be shaped as appropriate, for instance as a circle, ellipse, or portion thereof. In a preferred embodiment, it is shaped as a quarter ellipse. The exit section may diverge at an angle of about 5 to 10 degrees relative to the axis of the pipe 1, and preferably at an angle of about 6 to 7 degrees. As one skilled in the art will recognize, the venturi 5 could be designed in any number of ways and consistently with well-known venturi design constraints.

In one aspect of the disclosed invention, the venturi 5 assists the phase fraction meter 7 and/or the flow rate meter 8 by causing the fluid mixture within the pipe to become more uniform or homogenized. Referring to FIG. 2, it should be appreciated that the fluid mixture may not be well mixed (2) prior to its entry into the venturi 5. For example, large bubbles, or large unmixed sections of oil in water, may have formed in the mixture as it progresses along the pipe, perhaps aided by gravity or the natural tendency of such components to separate. However, once the fluid mixture enters the venturi 5, the fluid is subject to increased velocity in the throat 4 of the venturi. This tends to mix, or cavitate, the mixed fluid, particularly after it enters the outlet 10, resulting in a better homogenized version of the mixed fluid (9). This improved homogenization will provide a more constant input to both the phase fraction meter 7 and/or the flow rate meter 8, which should improve the accuracy of those meters. Moreover, the cavitation of the fluid mixture by the venturi 5 adds additional acoustic energy to the fluid mixture, making it easier for the meters 7 and/or 8 to passively detect the dynamics in the mixture. One skilled in the art will appreciate that because of the large acoustic impedance contrast in gas/liquid mixtures, fluid mixture mixing in such mixtures is more important than for liquid/liquid phase fraction determinations, such as for oil and water.

To realize the full benefit of the mixing that is provided by the venturi, the phase fraction meter 7 and/or the flow rate meter 8 should be placed within the wake created by the mixture. In other words, the meters 7 and/or 8 should not be placed so far from the venturi along the axis of the pipe that the mixture will have the opportunity to re-settle or re-segregate. On the other hand, the meters 7 and/or 8 may need to be suitably spaced from the venturi so that the turbulent effect of the venturi does not so directly affect the measurements being made or add "noise" to the measurement. A suitable spacing for the meters 7 and/or 8 will depend on several factors, such as the expected flow rate of the mixture, the speed at which the components in the mixture will settle, etc., and experimentation may be required in a given commercial setting to determine the optimal spacing. Depending on the application, it may not be necessary to place both the phase fraction meter 7 and the flow rate meter downstream from the venturi. For example, if suitably sensitive, the flow rate meter might be placed upstream of the venturi.

It is preferred to use a venturi 5 to provide mixing of the fluid mixture, especially when one considers the related benefits of the use of the venturi to measure flow momentum, as discussed below. However, should those additional benefits not be necessary in a given application, any other well-known means could be used in place of venturi 5 to mix the mixture. For example, a rotating paddle wheel, a screen containing holes, or other restriction or means for mechanically disrupting the mixture could be used. Likewise, other venturi-like structures could be made which would intrude into the inner diameter of the pipe to create sidewall discontinuities or undulations, which could have the same effect on cavitating the fluid mixture within the pipe.

The venturi is useful in aspects other than in just homogenizing the mixture. Specifically, and in accordance with another aspect of the invention, the pressure sensors 11 and 12 can be used to measure the pressure differential across the venturi 5. (Although drawn on the outside of the pipe 1, the pressure sensor 12 could also, and may preferably be, placed in conjunction with the wall of the venturi 5 at the throat 4, which might improve its dynamics). This pressure differential measurement allow different, or extra, information to be determined about the mixture, which can improve the accuracy of the phase fraction meter 8 and/or the flow rate meter 7, and which can be particularly useful in determining the phase fraction of a three-phase fluid mixture (e.g., oil/gas/water).

An example of how the addition of a venturi 5 can assist in determining the phase fractions in a three phase flow is first discussed. As is well known to those skilled in the art of fluid dynamics, the pressure differential ($\Delta P$) measured across the venturi by sensors 11 and 12 is proportional to the flow momentum of the fluid, i.e., $\Delta P = \alpha \rho_{mix} u_{mix}^2$, where $\rho_{mix}$ is the density of the mixture, $u_{mix}$ is the velocity of the mixture, and $\alpha$ is a constant or fitting parameter. Because the flow rate meter 8 measures the speed of the mixture, i.e., $u_{mix}$, (see U.S. patent application Ser. No. 09/346,607 for further details), the density of the mixture, $\rho_{mix}$, can be calculated. Moreover, the speed of sound in the mixture, $a_{mix}$, is measured by the phase fraction meter 7 as previously explained (see U.S. Pat. No. 6,354,147 for further details). The densities of the three components, e.g., oil, gas, and water, ($\rho_1$, $\rho_2$, and $\rho_3$) are also known, as are the speed of sound in these components ($a_1$, $a_2$, and $a_3$). From this, the phase fraction of the oil, gas, and water ($\phi_1$, $\phi_2$, $\phi_3$) can be calculated by the solving for these three variables in the following known fluid dynamics equations:

$$\rho_{mix} = \phi_1 \rho_1 = \phi_2 \rho_2 = \phi_3 \rho_3;$$

$$1 = \phi_1 + \phi_2 + \phi_3;$$

and $$1/(\rho_{mix} a_{mix}^2) = \phi_1/(\rho_1 a_1^2) + \phi_2/(\rho_2 a_2^2) + \phi_3/(\rho_3 a_3^2).$$

(The latter of these equations is known in the art as the "Wood Equation."). Accordingly, while an existing phase fraction meter has some capability to handle or infer the phase fraction for more than two-phase fluid mixtures, the accuracy of the phase fraction determination can be facilitated, and made more accurate, by the addition of the measurement provided by the venturi 5. Moreover, the disclosed technique is useful to measure phase fraction of three-liquid-phase mixtures, or those mixtures incorporating a gaseous phase.

The additional measurement provided by the venturi can also assist in improving, or calibrating existing phase fraction meters 7 and/or flow rate meters 8 when dealing with the simpler problem of two-phase fluid mixtures. Consider for example an oil/water mixture. Fundamental to the operation of known phase fraction meters such as those disclosed herein by reference is that the densities of the oil and water be known within some degree of accuracy. However, suppose the density of water cannot be accurately known. A practical example of this would occur if water produced in conjunction with oil from an oil/gas well inadvertently mixes with water used to pressurize the well. The mixed waters may have different densities, for example, because they may differ in salinity content. Therefore, if the produced water and the pressurizing water become mixed, for example, because of a breach in the production system, the density of the water may shift away from its assumed value. By using the venturi measurement, the overall density of the mixture can be calculated, which measurement can then be used to adjust or calculate the supposedly known density of the water in the fluid mixture by manipulating the above equations and/or other equations as one skilled in the art will appreciate. In other words, the venturi 5 can be said to "calibrate" the phase fraction meter 7 by providing additional measurements useful with respect to the phase fraction meter. In a sense, the venturi "over constrains" the system by providing additional measurements that are not necessarily needed by the phase fraction meter 7, but which can improve its accuracy, or double check the integrity of the fluidic parameters used by that system. The flow rate meter 8 can be similarly calibrated (e.g., double-checked or verified or adjusted), as one skilled in the art will appreciate by reviewing the incorporated references.

Although it has been disclosed that mixing or "homogenization" of the fluid mixture is believed advantageous to supply a homogenized fluid mixture to the phase fraction meter and/or flow rate meter 7, and hence preferable to place these meters downstream from the venturi 5, this is not necessary in all applications. If the meters can operate sufficiently in a given application without homogenizing the fluid mixture, then the venturi, and its accompanying flow momentum measurement, can be made downstream of the meters 7 and/or 8 by applying the same mathematical analysis described above. Indeed, this may be a desirable configuration in some applications if it is desired to calibrate the meters 7 and/or 8, or if it is desirable to use the flow momentum measurement to assist in determining the phase fraction of a three-phase flow, but it is not desirable to alter the native state of the fluid mixture in the pipe when making the flow rate and phase fraction measurements.

As one skilled in the art will appreciate, especially in light of the incorporated references, the various signals from the sensors and flow meters disclosed herein are preferably sent to computer to process and evaluate the received data, and to make the necessary mathematic calculations. If the disclosed sensors and/or flow meters are fiber optic based, the signals will first be sent to an optoelectric detector(s) to transform the optical signals into electrical signals useable by a standard computer, as is well known. Moreover, the optical devices may be multiplexed together, e.g., by wavelength-division multiplexing or time-division multiplexing, which would allow a single fiber optic fiber to carry the signals from the pipe to the necessary electronics, as is well known. In an oil/gas application, the pipe will preferably be deployed down the oil well and connected by a fiber optic cable(s) to the detection electronics and computer(s) residing on the earth's surface and accessible by an operator.

In summary, the measurement of flow momentum by the venturi 5 improves the phase fraction and/or flow rate measurement than when the phase fraction meter 7 and/or the flow rate meter 8 operated independently, and adds additional performance to the system.

The benefits disclosed herein can be realized independently of the orientation of the pipe, be it horizontal, vertical, or otherwise.

What is claimed is:

1. An apparatus for determining at least one parameter of a fluid mixture flowing in a conduit, comprising:
   a restriction at a first axial location along the conduit for homogenizing the fluid mixture downstream from the restriction; and
   at least one flow meter along the conduit for measuring at least one parameter of the homogenized fluid mixture, the flow meter comprising an array of pressure sensors for measuring unsteady pressure variations within the conduit.

2. The apparatus of claim 1, wherein the at least one flow meter is non-invasively coupled to the outside of the conduit.

3. The apparatus of claim 1, wherein the flow meter is selected from at least one member of the group consisting of a flow rate meter and a phase fraction meter.

4. The apparatus of claim 3, wherein the at least one parameter measured by the flow rate meter is indicative of the flow rate of the fluid mixture, and wherein the at least one parameter measured by the phase fraction meter is indicative of the phase fraction of the fluid mixture.

5. The apparatus of claim 4, further comprising a sensor along the conduit and selected from the group consisting of a pressure sensor and a temperature sensor.

6. The apparatus of claim 5, wherein the sensor is used to calibrate either the flow rate meter or the phase fraction meter.

7. The apparatus of claim 1, wherein the restriction comprises a venturi.

8. The apparatus of claim 7, further comprising a sensor assembly proximate to the venturi that provides at least one parameter indicative of a flow momentum of the fluid mixture.

9. The apparatus of claim 8, wherein the flow meters are comprised of a flow rate meter for measuring at least one parameter indicative of fluid mixture flow rate and a phase fraction meter for measuring at least one parameter indicative of the phase fractions of the fluid mixture.

10. The apparatus of claim 9, wherein the parameters indicative of flow momentum and flow rate are used to compute the phase fraction of the fluid mixture.

11. The apparatus of claim 9, wherein the at least one parameter indicative of flow momentum is used to calibrate either the flow rate meter or the phase fraction meter.

12. The apparatus of claim 1, wherein the pressure sensors are selected from the group consisting of a fiber optic based sensor, a piezoelectric sensor, a capacitive strain gauge, piezoresistive sensor, an accelerometer, and a hydrophone.

13. The apparatus of claim 1, wherein the first axial location is upstream of the flow meter.

14. The apparatus of claim 1, wherein the at least one parameter is selected from at least one member of the group consisting of a speed of sound of the fluid mixture, a velocity of the fluid mixture, and a phase fraction of the fluid mixture.

15. An apparatus for determining at least one parameter of a fluid mixture flowing in a conduit, comprising:
   a restriction at a first axial location along the conduit;
   at least one sensor assembly located at the restriction for providing at least one parameter indicative of the flow momentum of the fluid mixture;
   at least one flow meter at a second axial location along the conduit for providing at least one parameter indicative of the fluid mixture, the flow meter comprising an array of pressure sensors for measuring unsteady pressure variations within the conduit; and a computer for receiving the at least one parameter indicative of the flow momentum to calibrate the at least one flow meter.

16. The apparatus of claim 15, wherein the restriction comprises a venturi.

17. The apparatus of claim 15, wherein the at least one flow meter is fiber optic based.

18. The apparatus of claim 17, wherein the at least one flow meter is non-invasively coupled to the outside of the conduit.

19. The apparatus of claim 15, wherein the flow meter is selected from the group consisting of a flow rate meter and a phase fraction meter.

20. The apparatus of claim 19, wherein at least one parameter measured by the flow rate meter is indicative of the flow rate of the fluid mixture, and wherein the at least one parameter measured by the phase fraction meter is indicative of the phase fraction of the fluid mixture.

21. The apparatus of claim 20, further comprising an additional sensor along the conduit and selected from the group consisting of a pressure sensor and a temperature sensor.

22. The apparatus of claim 21, wherein the additional sensor is used to further calibrate either the flow rate meter or the phase fraction meter.

23. The apparatus of claim 15, wherein the sensor assembly comprises pressure sensors.

24. The apparatus of claim 23, wherein the at least one flow meter is downstream from the restriction in the flowing fluid mixture.

25. An apparatus for determining the phase fraction of components in a fluid mixture flowing in a conduit, comprising:
at least one sensor assembly located at a restriction for providing at least one parameter indicative of the flow momentum of the fluid mixture;
at least one flow rate meter along the conduit for providing at least one parameter indicative of the fluid mixture flow rate, the flow meter comprising an array of pressure sensors for measuring unsteady pressure variations within the conduit;
at least one phase fraction meter along the conduit for providing at least one parameter indicative of the density of the fluid mixture; and
a computer for receiving the at least one parameter indicative of the flow momentum, the at least one parameter indicative of the fluid mixture flow rate, and the at least one parameter indicative of the density of the fluid mixture to compute the phase fraction of components in the fluid mixture.

26. The apparatus of claim 25, further comprising an additional sensor along the conduit and selected from the group consisting of a pressure sensor and a temperature sensor.

27. The apparatus of claim 26, wherein the additional sensor is used to calibrate either the flow rate meter, the phase fraction meter, or the sensor assembly.

28. The apparatus of claim 25, wherein the flow rate meter, the phase fraction meter, or the sensor assembly are fiber optic based.

29. The apparatus of claim 28, wherein the flow rate meter, the phase fraction meter, or the sensor assembly are coupled to the outside of the conduit.

30. The apparatus of claim 25, wherein the at least one sensor assembly is located proximate to a restriction within the conduit.

31. The apparatus of claim 30, wherein the restriction comprises a venturi.

32. The apparatus of claim 30, wherein either the at least one flow rate meter or the at least one phase fraction meter is downstream from the restriction in the flowing fluid mixture.

33. The apparatus of claim 25, wherein the fluid mixture has three components.

34. The apparatus of claim 33, wherein one of the components is gaseous.

35. A method for determining at least one parameter of a fluid mixture flowing in a conduit, comprising:
homogenizing the fluid mixture by passing the mixture through a restriction in the conduit at a first axial location along the conduit; and
measuring at least one parameter of the homogenized fluid mixture using at least one flow meter along the conduit, the flow meter comprising an array of pressure sensors for measuring unsteady pressure variations within the conduit.

36. The method of claim 35, wherein the flow meter is selected from at least one member of the group consisting of a flow rate meter and a phase fraction meter.

37. The method of claim 36, wherein the at least one parameter measured by the flow rate meter is indicative of the flow rate of the fluid mixture, and wherein the at least one parameter measured by the phase fraction meter is indicative of the phase fraction of the fluid mixture.

38. The method of claim 35, wherein the at least one flow meter is non-invasively coupled to the outside of the conduit.

39. The method of claim 35, further comprising measuring the pressure or temperature of the fluid mixture.

40. The method of claim 39, further comprising calibrating either the flow rate meter or the phase fraction meter using the measured pressure or temperature.

41. The method of claim 35, wherein the restriction comprises a venturi.

42. The method of claim 35, further comprising measuring at least one parameter indicative of the flow momentum of the fluid mixture at the first axial location.

43. The method of claim 42, wherein the method contains two flow meters.

44. The method of claim 43, wherein the at least one parameters measured by the flow meters are indicative of the fluid mixture flow rate and a phase fraction.

45. The method of claim 43, wherein the at least one parameters indicative of the fluid mixture flow rate and the phase fraction are used to compute the phase fraction.

46. The method of claim 42, wherein the parameter indicative of the flow momentum is used to calibrate either the flow rate meter or the phase fraction meter.

47. The method of claim 35, wherein the pressure sensors are selected from the group consisting of a fiber optic based sensor, a piezoelectric sensor, a capacitive stain gauge, piezoresistive sensor, an accelerometer, and a hydrophone.

48. The method of claim 35, wherein the first axial location is upstream of the flow meter.

49. The method of claim 35, wherein the at least one parameter is selected from at least one member of the group consisting of a speed of sound of the fluid mixture, a velocity of the fluid mixture, and a phase fraction of the fluid mixture.

50. A method for determining at least one parameter of a fluid mixture flowing in a conduit, comprising:
measuring at least one parameter indicative of the flow momentum of the fluid mixture using a sensor assembly along the conduit;
measuring at least one parameter of the fluid mixture using at least one flow meter along the conduit, the flow meter comprising an array of pressure sensors for measuring unsteady pressure variations within the conduit;

calibrating the at least one flow meter using the at least one parameter indicative of the flow momentum.

51. The method of claim 50, wherein the parameter indicative of the flow momentum is measured at a location having a restriction in the conduit.

52. The method of claim 51, wherein the restriction comprises a venturi.

53. The method of claim 50, wherein the restriction homogenizes the fluid mixture before the at least one parameter of the fluid mixture is measured.

54. The method of claim 50, wherein the flow meter is selected from at least one member of the group consisting of a flow rate meter and a phase fraction meter.

55. The method of claim 54, further comprising measuring the pressure or temperature of the fluid mixture.

56. The method of claim 55, further comprising calibrating either the flow rate meter or the phase fraction meter using the measured pressure or temperature.

57. The method of claim 55, wherein at least one parameter measured by the flow rate meter is indicative of the flow rate of the fluid mixture, and wherein the at least one parameter measured by the phase fraction meter is indicative of the phase fraction of the fluid mixture.

58. The method of claim 50, wherein the at least one flow meter is coupled to the outside of the conduit.

59. The method of claim 50, wherein the method contains two flow meters.

60. The method of claim 59, wherein the at least one parameters measured by the flow meters are indicative of the fluid mixture flow rate and a phase fraction.

61. The method of claim 60, wherein the parameters indicative of the fluid mixture flow rate and the phase fraction are used to compute the phase fraction.

62. A method for determining the phase fraction of components in a fluid mixture flowing in a conduit, comprising:

measuring at least one parameter indicative of the flow momentum of the fluid mixture using a sensor assembly along the conduit;

measuring at least one parameter indicative of the fluid mixture flow rate using at least one flow rate meter along the conduit, the flow meter comprising an array of pressure sensors for measuring unsteady pressure variations within the conduit;

measuring at least one parameter indicative of the density of the fluid mixture using at least one phase fraction meter along the conduit; and computing the phase fraction of components in the fluid mixture using the at least one parameter indicative of the flow momentum, the at least one parameter indicative of the flow rate, and the at least one parameter indicative of the density.

63. The method of claim 62, wherein the parameter indicative of the flow momentum is measured at a location having a restriction in the conduit.

64. The method of claim 63, wherein the restriction comprises a venturi.

65. The method of claim 62, wherein the restriction homogenizes the fluid mixture before either the at least one parameter indicative of the flow rate or the at least one parameter indicative of the density are measured.

66. The method of claim 62, further comprising measuring the pressure or temperature of the fluid mixture.

67. The method of claim 66, further comprising calibrating either the flow rate meter or the phase fraction meter using the measured pressure or temperature.

68. The method of claim 62, wherein the flow rate meter, the phase fraction meter, or the sensor assembly are fiber optic based.

69. The method of claim 62, wherein the flow rate meter, the phase fraction meter, or the sensor assembly are coupled to the outside of the conduit.

70. The method of claim 62, wherein the fluid mixture has three components.

71. The method of claim 70, wherein one of the components is gaseous.

* * * * *